(12) United States Patent
Saso

(10) Patent No.: US 7,074,107 B2
(45) Date of Patent: Jul. 11, 2006

(54) DUCK CALL

(76) Inventor: Michael Saso, P.O. Box 6143, Modesto, CA (US) 95355

( * ) Notice: Subject to any disclaimer, the term of this patent is extended or adjusted under 35 U.S.C. 154(b) by 0 days.

(21) Appl. No.: 10/953,062

(22) Filed: Sep. 30, 2004

(65) Prior Publication Data

US 2005/0124260 A1    Jun. 9, 2005

Related U.S. Application Data

(60) Provisional application No. 60/507,133, filed on Oct. 1, 2003.

(51) Int. Cl.
*A63H 5/00*    (2006.01)
(52) U.S. Cl. .......................................... 446/204; 84/330
(58) Field of Classification Search ........ 446/202–208; 84/330, 330 R; 116/137 R
See application file for complete search history.

(56) References Cited

U.S. PATENT DOCUMENTS

| | | | | | |
|---|---|---|---|---|---|
| 603,555 | A | * | 5/1898 | Davis | 84/330 |
| 2,777,251 | A | * | 1/1957 | Bailey | 446/205 |
| 2,915,851 | A | * | 12/1959 | Ringman | 446/206 |
| 2,972,834 | A | * | 2/1961 | Bacon | 446/200 |
| 3,802,120 | A | * | 4/1974 | Erhart | 446/77 |
| 4,207,703 | A | * | 6/1980 | Saso | 446/205 |
| 6,413,139 | B1 | * | 7/2002 | Douglas | 446/204 |

* cited by examiner

*Primary Examiner*—Bena Miller
(74) *Attorney, Agent, or Firm*—Shlesinger Arkwright & Garvey LLP

(57) ABSTRACT

A game call comprising a main body forming a resonant chamber having a whistle vent and at least one opening adapted to be closed and opened by finger contact, a mouthpiece at one end of the resonant chamber, a roller suspended within the resonant chamber and aligned transverse to the longitudinal axis of the mouthpiece, the roller adapted to freely rotate about its longitudinal axis and a resonant chamber volume adjuster, the volume adjuster is adapted to selectively change the volume of the resonant chamber whereby the oscillation rate of said roller may be varied to control the sound emitted by the game call.

15 Claims, 2 Drawing Sheets

DUCK CALL

CROSS-REFERENCE TO RELATED APPLICATION

This application is a non-provisional application claiming the benefit of U.S. provisional application Ser. No. 60/507,133 filed on Oct. 1, 2003.

FIELD OF THE INVENTION

The present invention relates to game calls and in particular, a game call for precisely imitating the sounds of water foul.

BACKGROUND OF THE INVENTION

Whistle-type game calls simulate the sound of certain waterfowl, for example, pintail ducks or green winged teal ducks. These game calls are provided with a resonant chamber into which air is blown to produce the desired whistling sound. Some game calls require the user to flutter their tongue as they blow into the mouthpiece so that a desired sound is produced. Others provide a rod within the resonant chamber that is aligned transverse to the direction of air flow into the game call. The rod eliminates the need for the user to flutter their tongue as they blow into the game call. Air flow entering the resonant chamber causes the rod to rotate about its longitudinal axis and a desired whistling sound is produced.

However, the rod is not fixed to the interior of the resonant chamber or otherwise suspended in it. As a result, it tends to come into contact with saliva that accumulates within the resonant chamber. The moisture from the saliva reduces the oscillation rate of the rod which has an undesirable effect on the sound produced by the call. Even in the best of circumstances, it is difficult to blow into the whistle in a manner so that a consistent sound is produced. A high pitch sound requires the user to forcefully blow into the whistle which generates rapid oscillation of the rod whereas a lower pitch sound requires a much slower oscillation rate. It is difficult for a user to maintain a constant oscillate rate at the desired speed. A consistent oscillation rate will generate a whistling sound having a pitch and tone that is uniform and realistic. It is essential for the duck call to produce a realistic sound so that a desired species of duck is attracted.

DETAILED DESCRIPTION OF THE PREFERRED EMBODIMENTS

Figure 1:
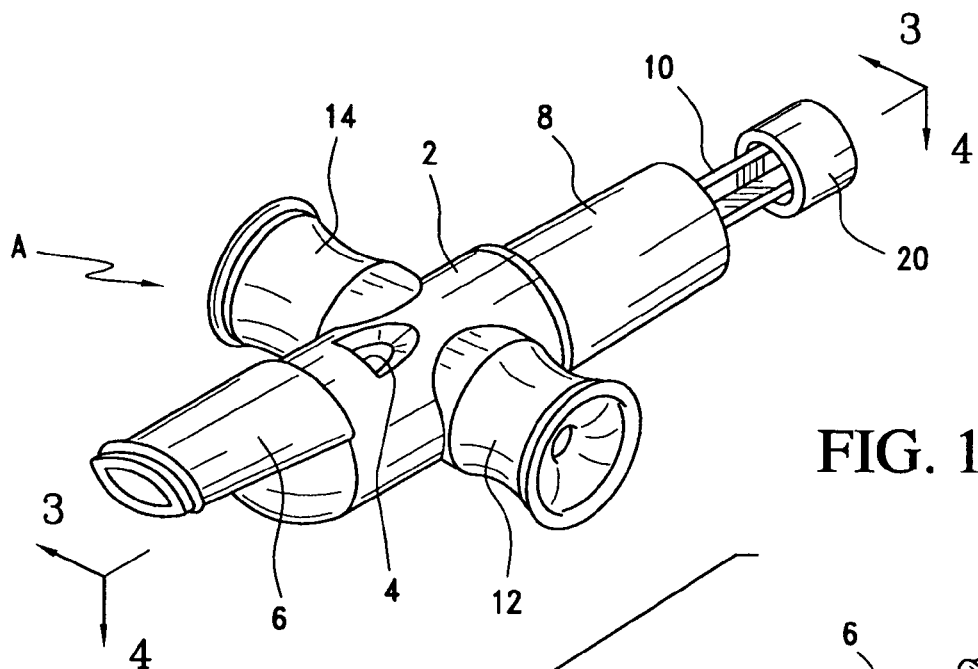
FIG. 1 is perspective view showing the duck call of the present invention.
Figure 2:
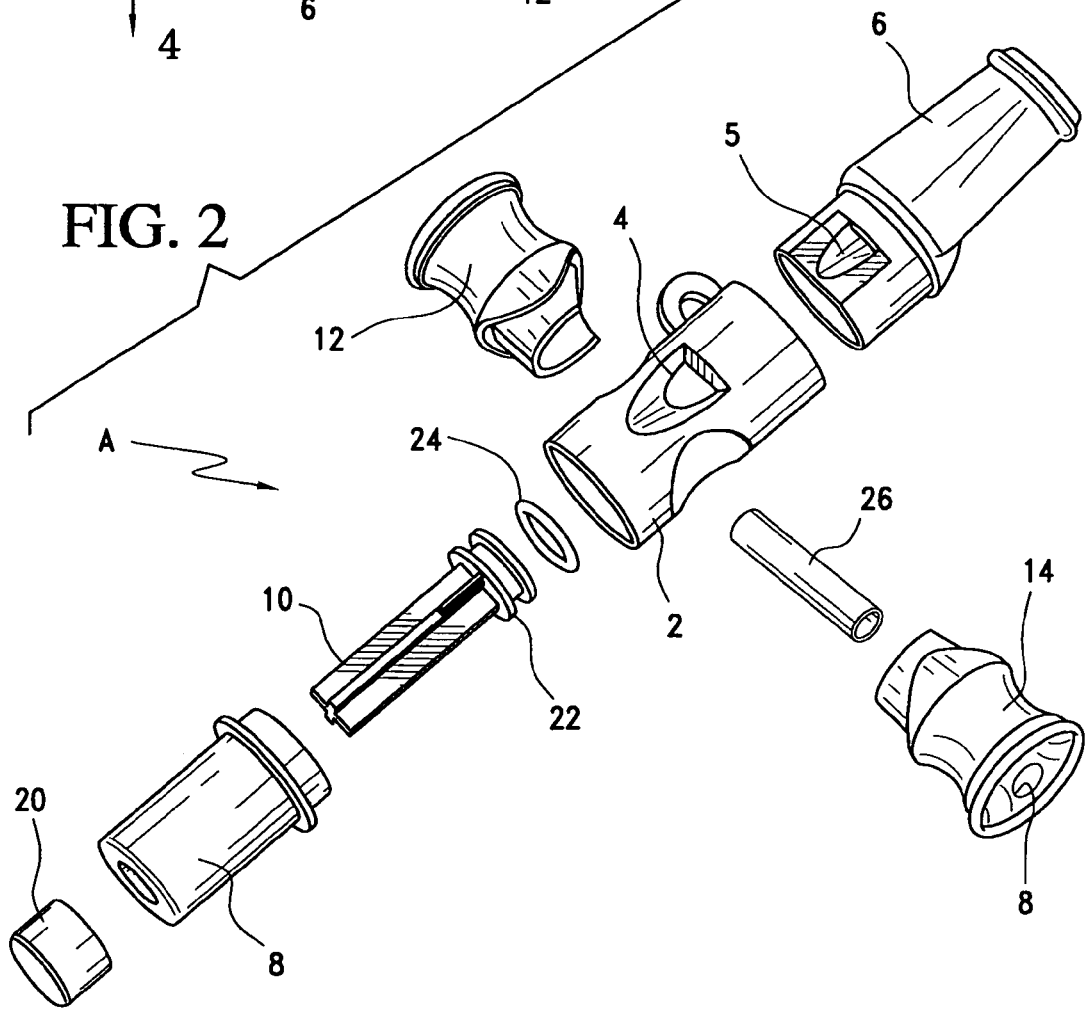
FIG. 2 is an exploded view of the duck call shown in FIG. 1.

As shown in FIGS. 1 and 2, the game call A of the present invention is a whistle comprising a central cylinder 2 having connected at one end a mouthpiece 6 and at a second end a barrel portion 8. The barrel portion includes an interior chamber 9. The mouthpiece includes an interior chamber 11.

The top of the central cylinder 2 is provided with a whistle vent 4 from which the duck sound is emitted. The mouthpiece 6 includes a slot 5 disposed at the interface with central cylinder 2, the slot 5 is in fluid communication with the mouthpiece 6 and the interior of central cylinder 2. Attached to the central cylinder 2 and in fluid communication therewith are a pair of side chambers or end cylinders 12 and 14 extending transverse to the longitudinal axis of the central cylinder 2. Side cylinder 12 includes a vent or opening 16 and side cylinder 14 includes a vent or opening 18, each of which is adapted to be opened and closed by covering of the vent by finger contact and in the known manner while blowing into the call to generate a particular sound which is emitted through vent 4.

The central cylinder 2, side cylinders 12 and 14, together with interior chamber 9 and interior chamber 11 form a resonant chamber.

The central cylinder 2 and side cylinders 12 and 14 receive a flutter rod 26 which generally extends from vent 16 to vent 18 of the respective side cylinders. The flutter rod 26 is a tube at least partially filled with ballast material shown in the drawings to be a Styrofoam insert occupying about fifty percent of the interior of the flutter rod. As is apparent, the flutter rod may be formed as a solid rod rather than a tube which obviates the need for an insert.

Figure 4:
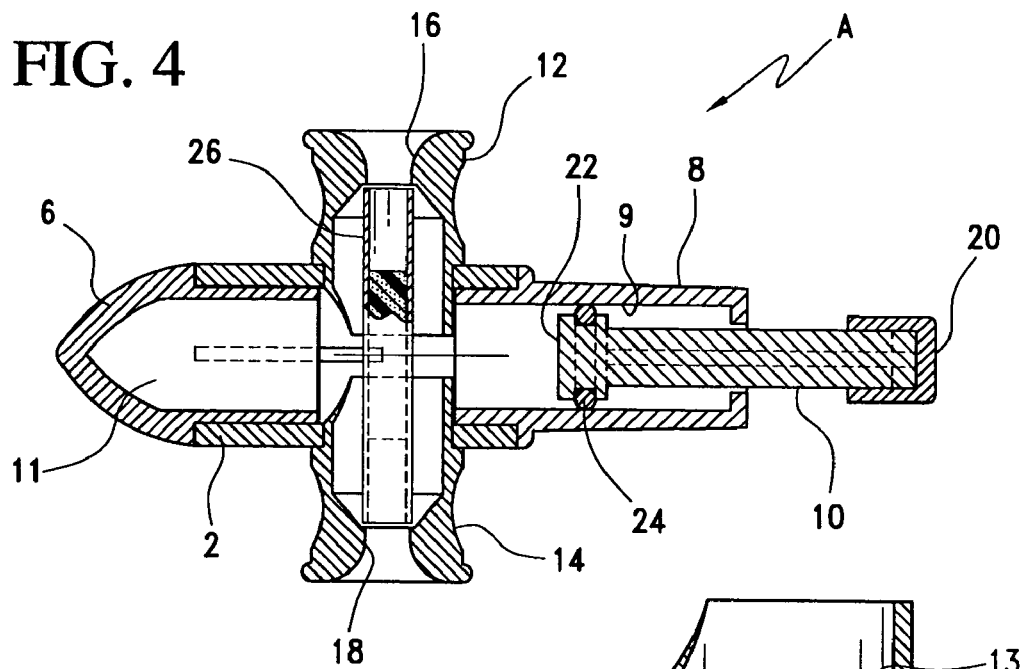
FIG. 4 is cross sectional view taken along lines 4—4 of FIG. 1.
Figure 5:
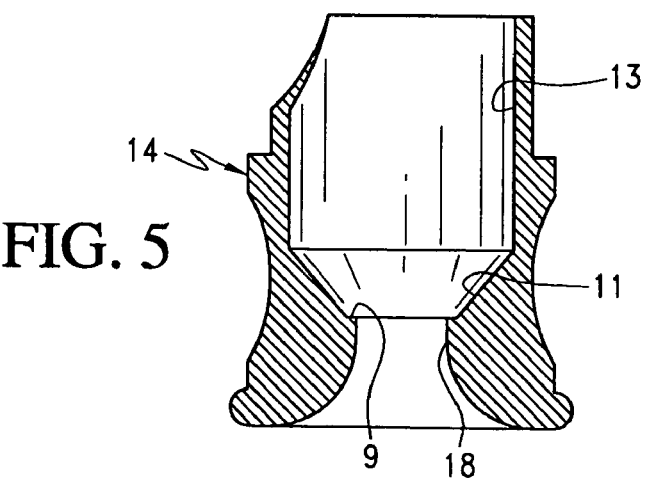
FIG. 5 is an enlarged sectional view of an end cylinder.

FIG. 5 illustrates in greater detail one of the two side cylinders, which is shown to have a radial cone portion 11 extending from an interior wall 13 to the narrow opening 18 of the side cylinder 14. An annular shoulder 9 assists in supporting one end of the flutter rod 26 while the opposite end of the flutter rod is similarly supported by an annular shoulder associated with the other side cylinder 12 and in the manner as generally shown in FIG. 4. The flutter rod 26 is thereby rotatably suspended within the game call and prevented from contacting saliva which accumulates within the duck call during use. The length of the flutter rod 26 is sufficient so that the rod is supported in the manner shown in FIG. 4 and also adapted to be caused to freely rotate when air is blown into the game call.

The barrel portion 8 is fitted at the end opposite central cylinder 2 with a piston arm or plunger 10 having at one end a cap member 20 and at the opposite end a piston 22. Piston 22 is fitted with an O-ring 24 to enable the piston to sealingly engage the interior walls of barrel 8. The piston arm operates as a plunger that may be selectively slid into and out of the barrel 8 by grasping cap 20 and pushing or pulling the piston arm 10. This piston arm functions as a resonant chamber volume adjuster which controls the oscillation speed of the flutter rod by modifying the size of the resonant chamber in the game call. Other volume adjuster devices are within the scope of the invention so long as the device selected will effectively modify the size of the resonant chamber.

Figure 3:
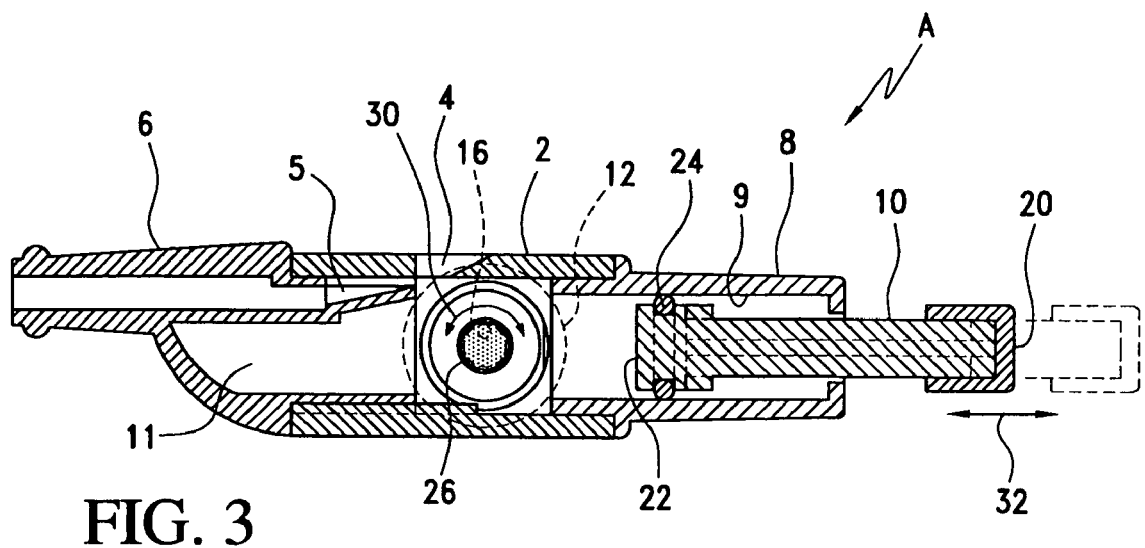
FIG. 3 is cross sectional view taken along lines 3—3 of FIG. 1.

When a user blows into the mouthpiece 6, air enters the resonant chamber causing the flutter rod 26 to roll about its longitudinal axis or otherwise oscillate within side cylinders 12 and 14 as indicated by arrow 30 of FIG. 3. At the same time, vents 18 and 16 are closed or opened by finger contact to selectively control the sound emitting from vent 4 of the duck call. The piston arm or volume adjuster 10 is used to precisely regulate the speed at which the flutter rod oscillates and thereby control the sound emitting from the game call so that the sound emitted through the vent 4 is precise and uniform. For example, as the slide tuner is pulled outwardly from barrel 8, the size of the resonant chamber within the interior of the call is increased as indicated by arrow 32 of FIG. 3. This increase in area of the resonant chamber decreases oscillation of the flutter rod 26 which deepens the tone of the sound emitting from the vent 4 to imitate, for example, a pintail duck. Conversely, if the piston arm or plunger 10 is pushed all the way in to the barrel 8 the resonant chamber within the interior of the call is decreased in size. This decrease in area of the resonant chamber will result in an increase in oscillation speed of the flutter rod 26 and give the tone of the sound emitting from the vent a high pitch, imitating, for example, a green wing teal duck. As is apparent, the plunger may be adjusted to vary the size of the resonant chamber between the full open and full closed positions. The present invention enables a user to precisely adjust and maintain a specific pitch of the sound when blowing into the mouthpiece and selectively opening and closing the openings 16 and 18 of the side cylinder.

While this invention has been described as having a preferred design, it is understood that it is capable of further modifications, and uses and/or adaptations of the invention and following in general the principle of the invention and including such departures from the present disclosure as come within the known or customary practice in the art to which the invention pertains, and as may be applied to the central features hereinbefore set forth, and fall within the scope of the invention or limits of the claims appended hereto.

I claim:

1. A game call comprising:
   a) a main body forming a resonant chamber having a whistle vent and at least one opening adapted to be closed and opened by finger contact;
   b) a mouthpiece at one end of said resonant chamber and in fluid communication therewith;
   c) a roller suspended within said resonant chamber and aligned transverse to the longitudinal axis of said mouthpiece, said roller having first and second ends thereof and adapted to freely rotate about its longitudinal axis;
   d) a resonant chamber volume adjuster, said volume adjuster is adapted to selectively change the volume of said resonant chamber during use whereby the oscillation rate of said roller may be varied to control the sound emitted by the game call; and
   e) a roller support, said roller support comprising a pair of opposed conical sections between which said roller is disposed, said conical sections extend transverse to the longitudinal axis of said resonant chamber and each provided with a shoulder portion configured to receive a separate one of said roller first and second ends.

2. A game call as in claim 1 and wherein said resonant chamber volume adjuster is a piston operatively associated with said resonant chamber and aligned along the longitudinal axis thereof and adapted to be selectively extended therein and retracted therefrom so that said resonant chamber may be correspondingly decreased and increased in volume.

3. A game call as in claim 2 and further including:
   a) a resonant chamber extended portion, said resonant chamber extended portion in fluid communication with said resonant chamber and extending transverse to said roller, said piston is operatively associated with said resonant chamber extended portion so that the interior volume thereof may be selectively adjusted in size.

4. A game call as in claim 3 and wherein said mouthpiece and said resonant chamber extended portion are aligned along a common longitudinal axis.

5. A game call as in claim 2 and wherein said piston is provided with a seal for sealing engagement between said resonant chamber and said piston.

6. A game call as in claim 2 and wherein said piston provided with a stop means for limiting the range of motion of said piston.

7. A game call as in claim 1 and wherein said at least one opening adapted to be opened and closed by finger contact comprises a pair of side vents extending from said main body and in fluid communication with said resonant chamber, said roller extends between said pair of side vents and is coaxially aligned therewith.

8. A game call as in claim 1 and wherein said roller contains a ballast material within the interior thereof.

9. A game call comprising:
   a) a main body forming a resonant chamber having a whistle vent and at least one opening adapted to be closed and opened by finger contact;
   b) a mouthpiece at one end of said resonant chamber and in fluid communication therewith;
   c) a roller suspended within said resonant chamber and aligned transverse to the longitudinal axis of said mouthpiece, said roller is adapted to freely rotate about its longitudinal axis and includes an insert formed from a ballast material;
   d) a roller support, said roller support adapted to suspend said roller within said resonant chamber wherein said roller support comprises a pair of opposed conical sections between which said roller is disposed, said conical sections extend transverse to the longitudinal axis of said resonant chamber, said roller having first and second ends thereof, each of said conical sections is provided with a shoulder portion configured to receive a separate one of said first and second end of said roller; and
   e) a resonant chamber volume adjuster, said volume adjuster is adapted to selectively change the volume of said resonant chamber during use whereby the oscillation rate of said roller may be varied to control the sound emitted by the game call.

10. A game call comprising:
    a) a main body forming a resonant chamber and having a whistle vent and a pair of side openings adapted to be closed and opened by finger contact, said pair of side openings coaxially aligned along a central axis;
    b) a mouthpiece at one end of said resonant chamber and in fluid communication therewith;
    c) a roller member having first and second ends, said roller member disposed within said resonant chamber and coaxially aligned with the central axis of said pair of side openings whereby said roller is suspended within said resonant chamber at each of said first and second end thereof and is adapted to freely rotate about its longitudinal axis as air is blown into said mouthpiece; and
    d) a resonant chamber volume adjuster, said volume adjusted is operatively associated with said resonant chamber and located at an opposite end thereof from said mouthpiece, said volume adjuster is adapted to selectively vary the interior volume of said resonant chamber during use whereby the oscillation rate of said roller may be varied to control the sound emitted by the game call wherein each of said pair of side openings provided with a conical section each of which is adapted to receive a separate one of said roller first and second and thereby support said roller in its suspended position and each of said conical sections provided with a shoulder portion configured to receive a separate one of said roller first and second ends.

11. A game call as in claim 10 and wherein said resonant chamber volume adjuster is a piston operatively associated with said resonant chamber and aligned along the longitudinal axis thereof and adapted to be selectively extended therein and retracted therefrom so that said resonant chamber may be correspondingly decreased and increased in volume.

12. A game call as in claim 11 and wherein said resonant chamber including an extended portion, said resonant chamber extended portion in fluid communication with said resonant chamber and extending transverse to said roller, said piston is operatively associated with said resonant chamber extended portion so that the interior volume thereof may be selectively adjusted in size.

13. A game call as in claim 10 and wherein said roller is a tube containing a ballast material.

14. A game call as in claim 10 and wherein said mouthpiece, said resonant chamber and said resonant chamber extended portion are aligned along a common longitudinal axis.

15. A game call as in claim 10 and wherein said roller is a solid rod.

* * * * *